United States Patent [19]

Bierbaum

[11] Patent Number: 5,244,080
[45] Date of Patent: Sep. 14, 1993

[54] INFORMATION BEARING BELT CONVEYOR

[75] Inventor: Heinz J. Bierbaum, Dülmen, Fed. Rep. of Germany

[73] Assignee: Promotex Werbetechnik GmbH, Ratingen, Fed. Rep. of Germany

[21] Appl. No.: 937,353

[22] Filed: Aug. 27, 1992

[30] Foreign Application Priority Data

Aug. 29, 1991 [DE] Fed. Rep. of Germany ....... 4128664
Jul. 2, 1992 [EP] European Pat. Off. ......... 92111257.9

[51] Int. Cl.$^5$ .............................................. B65G 43/00
[52] U.S. Cl. ................................. 198/502.1; 198/847; 40/472; 40/524
[58] Field of Search ............... 198/502.1, 847, 803.14, 198/803.15; 40/472, 524, 580, 579

[56] References Cited

U.S. PATENT DOCUMENTS

| | | | |
|---|---|---|---|
| 1,812,715 | 6/1931 | Quillen et al. | 40/472 |
| 3,515,443 | 6/1970 | Hallaman | 198/847 |
| 3,538,997 | 11/1970 | Christine et al. | 198/803.15 X |
| 3,612,244 | 10/1971 | Raub, Sr. et al. | 198/579 |
| 3,849,918 | 11/1974 | Mazzocco, Sr. | 40/472 |
| 3,982,625 | 9/1976 | Wentz et al. | 198/578 X |
| 4,936,442 | 6/1990 | Von Till | 198/803.15 X |
| 4,979,591 | 12/1990 | Habegger et al. | 198/502.1 X |
| 5,165,526 | 11/1992 | Conklin, Jr. | 198/850 X |

FOREIGN PATENT DOCUMENTS

1828372 12/1960 Fed. Rep. of Germany.
3505799 1/1986 Fed. Rep. of Germany.
3-138297 6/1991 Japan ................................. 198/337

OTHER PUBLICATIONS

Article "Probleme der Fördergurt-Reparatur", W. Lubrich, Braunkohle, Wärme und Energie, pp. 3–11.

*Primary Examiner*—Robert P. Olszewski
*Assistant Examiner*—Cheryl L. Gastineau
*Attorney, Agent, or Firm*—Darby & Darby

[57] ABSTRACT

The belt of a belt conveyor has at least one layer provided with windows which extend all the way through the layer and have outlines corresponding to those of letters, numerals and/or other symbols. The windows receive inserts or indicia which preferably fill the respective windows and are welded, glued or otherwise affixed to the belt. The useful life of the inserts is the same as that of the belt, and at least one characteristic (for example, color) of each insert is selected in such a way that the installed insert or inserts can be readily discerned by an eye at one or both sides of the layer. The layer which is provided with the window or windows can have one or more strata (thinner layers), such as an outer stratum of plastic material, a reinforcing intermediate layer or stratum of textile material or the like, and a layer or stratum which can constitute a substrate. The windowed layer can constitute one plate of a carrousel wherein the belt is assembled of a series of partially overlapping plates or layers serving to transport pieces of luggage or the like.

21 Claims, 3 Drawing Sheets

INFORMATION BEARING BELT CONVEYOR

BACKGROUND OF THE INVENTION

The invention relates to conveyors in general, and more particularly to improvements in belt conveyors. Still more particularly, the invention relates to improvements in belt conveyors of the type wherein the belt carries information and/or decorative matter which can be observed while the belt is in motion, e.g., to transport merchandise at a checkout counter in a supermarket or the like or to transport baggage at an airport terminal.

Conveyors of the type to which the present invention pertains are disclosed, for example, in German Utility Model No. 18 28 372. The belt of the conveyor which is disclosed in the Utility Model carries one or more separately produced indicia which are welded to the exposed surface of the belt but do not extend through the respective layer or through the single layer of the belt. Such mode of affixing separately produced indicia to the belt results in at least some blurring of the outline of each applied indicium. This affects the effectiveness of the indicia as an advertising slogan, a trademark or an item of information to those observing the moving belt. Moreover, and since the affixed indicium or indicia do not extend all the way through the belt, they are likely to wear away before the belt itself is ready to be discarded, i.e., the last stage of utilization takes place while the belt is still operative but the information or message which was to be conveyed by the applied indicium or indicia is no longer existent or is no longer discernible. The situation is further aggravated if the indicium or indicia are simply applied over one side of a belt, i.e., if they are not even partially recessed into the belt.

OBJECTS OF THE INVENTION

An object of the invention is to provide a conveyor wherein the belt carries one or more indicia in such a way that each indicium remains readily discernible as long as the belt is capable of being put to use.

Another object of the invention is to provide a conveyor, e.g., a carrousel, wherein the useful life of each indicium matches or closely approximates the useful life of the belt.

A further object of the invention is to provide a novel and improved belt for use in the above outlined conveyor.

An additional object of the invention is to provide a novel and improved method of manipulating a belt prior to the application of one or more indicia thereto.

Still another object of the invention is to provide a novel and improved method of securing one or more indicia (e.g., letters, numerals and/or other symbols) to the belt of an endless belt conveyor.

A further object of the invention is to provide a carrousel which embodies the above outlined belt.

Another object of the invention is to provide a conveyor wherein the outline or outlines of one or more indicia which are applied to the belt are clearly discernible during the entire useful life of the belt.

SUMMARY OF THE INVENTION

One feature of the present invention resides in the provision of a conveyor which comprises a belt or band including at least one layer with a first side, a second side and at least one window extending all the way from the first side to the second side. The window has an outline which is complementary to the outline of an indicium or insert (e.g., an insert in the form of a letter, numeral or another symbol) received in the at least one window and being affixed (e.g., bonded) to the belt. The insert has at least one characteristic which facilitates optical discernment of the insert by an eye trained upon the at least one side of the at least one layer.

The at least one layer can comprise a plurality of strata, e.g., a first stratum of an elastomeric material and a second stratum consisting, e.g., of a textile material and constituting a reinforcing layer of the belt.

The resistance of the at least one layer to wear can approximate or match the resistance of the insert. Alternatively, or in addition to such resistance, the thickness of the at least one layer can match or at least approximate the thickness of the insert.

The at least one layer can be provided with a series of discrete windows or with a more or less complex single window denoting, for example, a handwritten word, a trademark or another symbol, a geometrical figure and/or others.

The at least one characteristic can constitute the color or hue of the insert. Thus, at least the one side of the at least one layer can have a color or hue or a combination of colors different from the color or hue or combination of colors of that side of the insert which is optically discernible (e.g., by a human eye or by a photoelectric eye or cell) at the one side of the at least one layer.

The belt can constitute an endless belt and its at least one layer can contain (e.g., consist of) an elastomeric material. Such endless belt can be used with advantage to transport merchandise at the checkout counters in supermarkets or like establishments. Alternatively, the belt can be assembled of a plurality of partially overlapping layers which are movable relative to each other. Typical examples of such conveyors are so-called carrousels which are utilized at airport terminals to deliver luggage to arriving passengers or porters. Each layer of such carrousel can constitute a discrete leaf having, for example, an outer stratum of a highly wear-resistant plastic material and an inner stratum of metallic sheet material. Alternatively, each leaf can comprise the at least one layer of wear-resistant plastic material and a backup layer or substrate of metallic sheet material.

The belt can further comprise a preferably flexible light-transmitting layer or film overlying the one side of the at least one layer and the respective side of the insert in the at least one layer.

The belt can comprise a flexible or even rigid substrate at the other side of the at least one layer. Furthermore, the belt can comprise a reinforcing layer at the other side of the at least one layer, e.g., between the at least one layer and the substrate. The reinforcing layer can contain or can consist of textile material, and such layer can be sandwiched between the at least one layer and the substrate.

It is often preferred to make the at least one layer of a suitable wear-resistant plastic material and to make the insert of the same material, as long as the insert is readily discernible by a human eye or by a photoelectric eye when looked at from the one side of the at least one layer.

Another feature of the invention resides in the provision of a method of making a conveyor, e.g., the endless conveyor of a carrousel or the endless conveyor from merchandise at the checkout counter of a supermarket, department store, drugstore or a similar establishment.

The method comprises the steps of providing a belt having a first side and a second side with at least one window extending all the way from the first side to the second side and having a predetermined outline (e.g., that of a letter or numeral), introducing into the at least one window an insert having a second outline complementary to the predetermined outline and having at least one characteristic (e.g., color) which facilitates optical discernment of the insert by an eye at least from one side of the at least one layer, and affixing (e.g., welding or glueing) the insert to the belt. The providing step can comprise severing the at least one layer with a liquid jet, e.g., a water jet.

The method can further comprise the step of making the insert including cutting the insert out of at least one second layer, e.g., with a liquid jet.

The novel features which are considered as characteristic of the invention are set forth in particular in the appended claims. The improved conveyor itself, however, both as to its construction and its mode of operation, together with additional features and advantages thereof, will be best understood upon perusal of the following detailed description of certain presently preferred specific embodiments with reference to the accompanying drawings.

DESCRIPTION OF THE PREFERRED EMBODIMENTS

Figure 1:
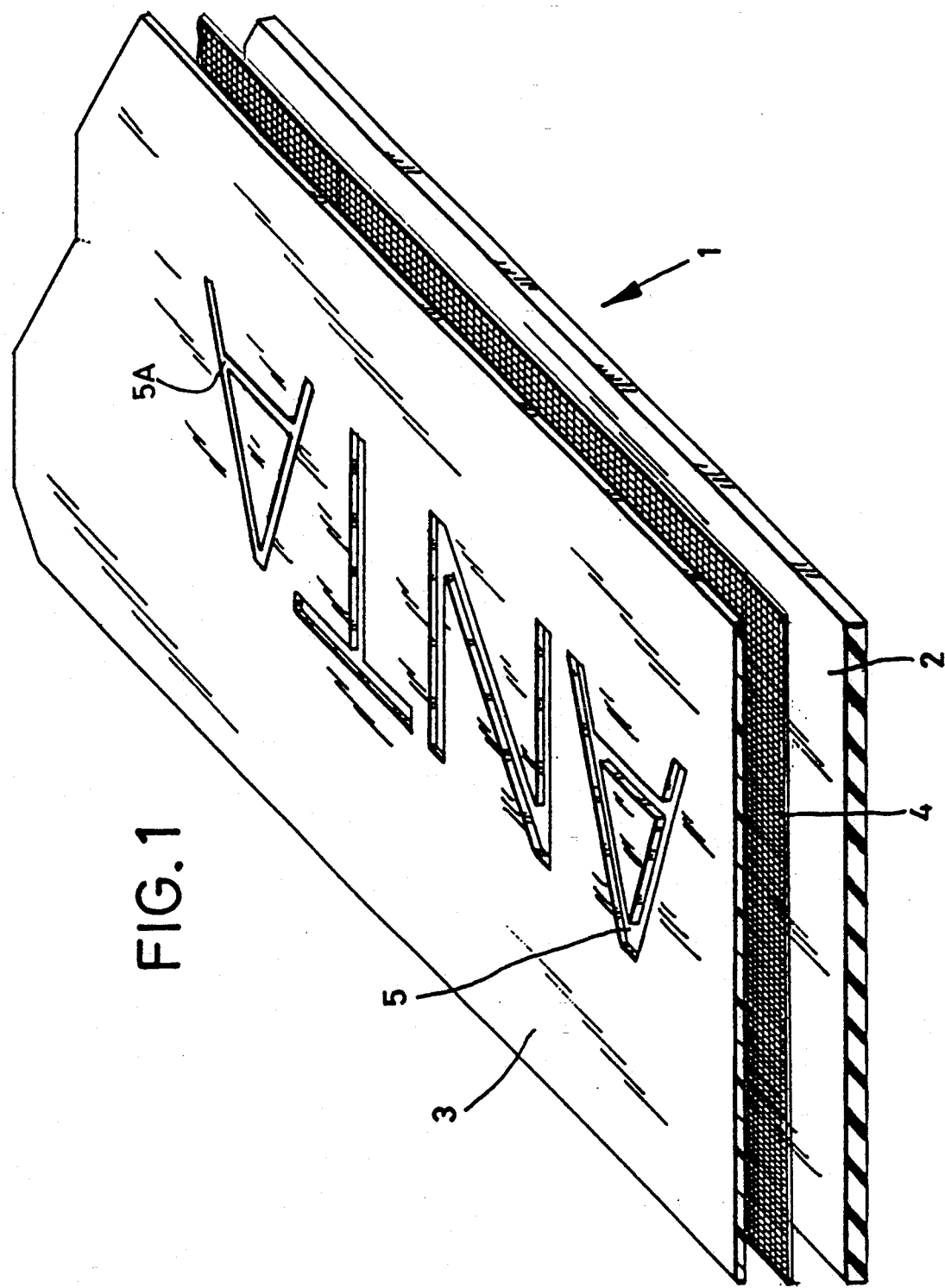
FIG. 1 is a fragmentary exploded perspective view of a belt conveyor which embodies one form of the invention and wherein a plastic layer is provided with a row of windows for discrete indicia or inserts in the form of capital letters.

Referring first to FIG. 1, there is shown a portion of a conveyor having an endless belt 1. The belt 1 comprises a first layer composed of strata 3, 4 and a second layer or substrate 2. The substrate 2 is made of rubber or a similar material, the stratum 3 is made of a flexible plastic material, and the stratum 4 is made of a textile material and serves as a means for reinforcing the composite layer including the strata 3 and 4. The stratum 4 is sandwiched between the stratum 3 and the substrate 2, and the three components of the belt are bonded (e.g., welded or adhesively affixed) to each other.

In accordance with a feature of the invention, the composite layer including the strata 3 and 4 is formed with a row of windows or cutouts 5 each of which has a predetermined specific outline complementary to the outline of an indicium in the form of a flat insert 5A (shown in the rightmost window of the stratum 3) which at least partially but preferably completely or nearly completely fills the respective window or cutout 5. The material of each insert 5A is or can be the same as the material of the stratum 3, and each insert is welded or otherwise affixed to the layer including the strata 3 and 4. The illustrated windows 5 have outlines corresponding to those of capital letters; however, it is equally possible to provide windows having outlines corresponding to those of numerals, trademarks, complete words, geometrical figures and/or many others. These outlines are complementary to those of the respective inserts 5A. The outlines of the properly installed inserts 5A are readily discernible irrespective of the already elapsed period of use of the belt 1 because each insert is received in a window extending all the way through the stratum 3 of the composite layer or through both strata (3 and 4) of such layer. If the inserts 5A have a thickness corresponding to that of the stratum 3, if the inserts are introduced into the respective windows in such a way that each insert completely or practically completely fills the respective window, and if the material of the inserts is the same as the material of the stratum 3, the inserts wear away (in actual use of the belt 1) at the same rate as the stratum 3. The same holds true if the material of the inserts 5A is different from the material of the stratum 3 but exhibits the same or nearly identical resistance to wear.

At least one characteristic, particularly color, of each insert 5A is preferably different from the corresponding characteristic of the stratum 3. This ensures that the inserts 5A are readily optically discernible by a human eye or by a photoelectric eye when observed from the upper side of the stratum 3, as viewed in FIG. 1.

If the windows 5 extend through the stratum 3 as well as through the corresponding portions of the stratum 4, the concealed sides of the inserts 5A can be bonded to the strata 3, 4 of the composite layer as well as to the adjacent side of the second layer or substrate 2.

The windows 5 can be formed by resorting to a cutter which operates with a jet of pressurized liquid, e.g., with a water jet. Such cutters have been found to be capable of imparting to the windows 5 an outline which is exactly complementary to that of the corresponding inserts or indicia 5A. The same procedure can be resorted to in connection with the cutting of inserts 5A from another layer made of a material which is or can be identical with the material of the stratum 3, with the exception of at least one characteristic, preferably color. For example, white, yellow or green indicia or inserts 5A in the windows 5 of a black stratum 3 can be readily discerned by an eye regardless of the extent of wear upon the stratum 3 and the inserts. Furthermore, the outlines of inserts 5A having a color different from that of the stratum 3 remain clearly discernible during the entire useful life of the belt 1, i.e., during the useful life of (a) the layer including the strata 3 and 4, and (b) the inserts 5A.

Of course, the one characteristic which distinguishes the inserts 5A from the stratum 3 need not be color. It is equally within the purview of the invention to make the inserts 5A of a light-transmitting or reflecting material and to make the stratum 3 of a material which does not transmit or reflect light as readily as the inserts, or vice versa. It is also possible to impart to the exposed sides of the inserts 5A a finish which is different from that of the exposed side of the stratum 3, especially if the wear upon the exposed sides of the stratum 3 and inserts 5A is not expected to be very pronounced. Still further, the exposed surface of the stratum 3 can exhibit one or more colors different from the color or colors of the inserts 5A. The improved belt 1 can be utilized with advantage to convey messages by advertisers, e.g., the trademarks and/or slogans and/or names and/or prices and/or instructions to use. Such belt can be employed in a supermarket or in a similar establishment to transport merchandise at the checkout counters. The manner in which the belt 1 is trained over one or more pulleys or the like is conventional and is not shown in the drawing.

If the windows 5 are to be provided in the strata 3 and 4 of the composite layer which is carried by the substrate 2, the strata 3, 4 can be bonded or otherwise affixed to each other prior to the utilization of a severing tool which is used to remove material that is necessary to form the windows. The stratum 4 can be omitted, i.e., the layer which is provided with one or more windows 5 can consist of a single stratum, and such layer can be used with or without the substrate 2.

If the windows 5 are to be provided only between the two sides of the stratum 3, the formation of windows, the introduction of inserts 5A and the bonding of inserts to the stratum 3 can precede the reinforcement of the stratum 3 and inserts 5A by the reinforcing stratum 4 or in another suitable way. if the stratum 4 is to be omitted, the stratum (layer) 3 can be provided with windows 5 and placed onto the substrate 2, the inserts 5A can be introduced into the windows 5, and the stratum 3 and the inserts are then bonded or otherwise reliably affixed to the substrate 2.

The illustrated windows 5 can be replaced by or used jointly with windows forming one or more rows extending transversely of the longitudinal direction of the belt 1.

Figure 2:
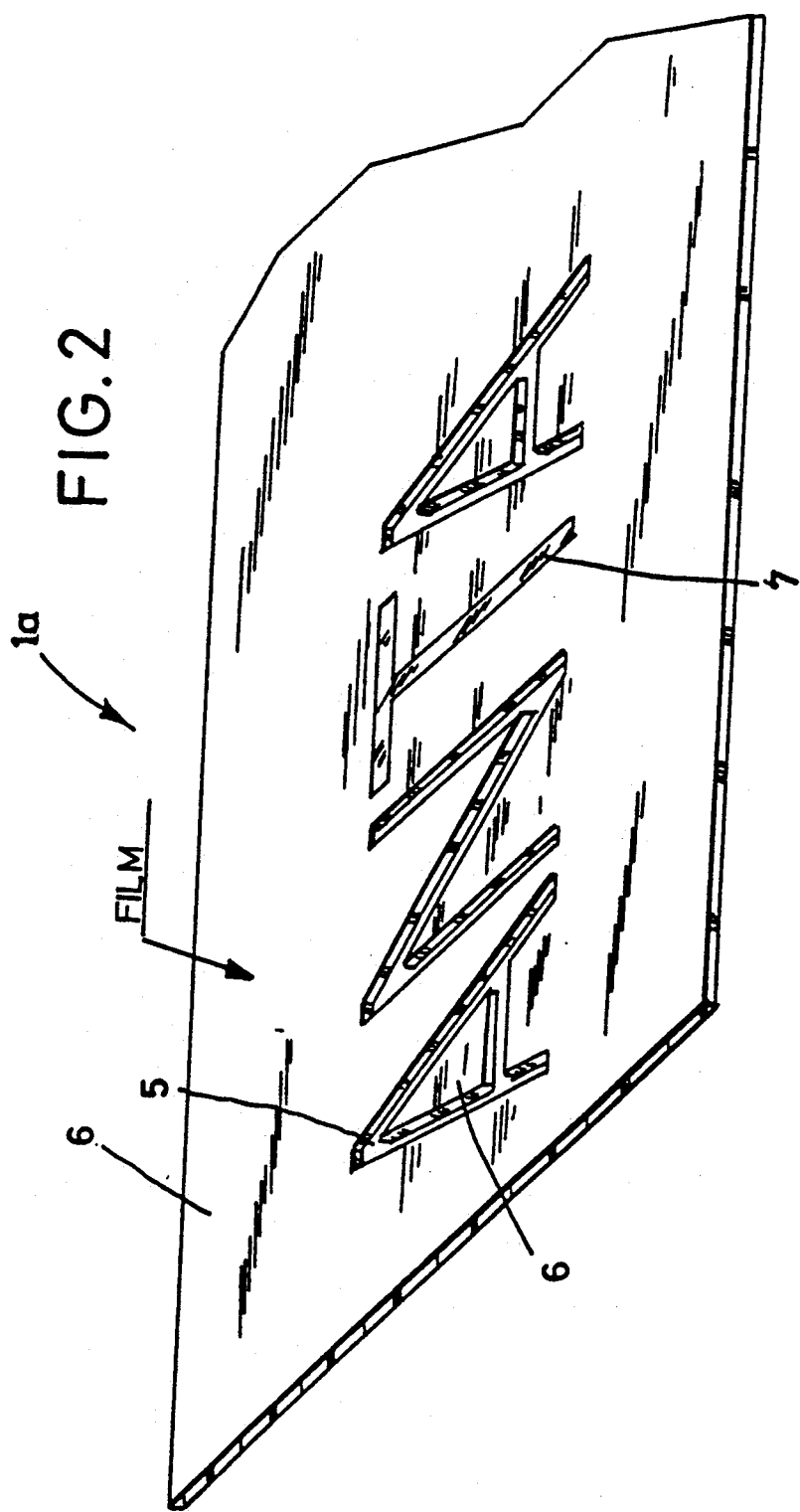
FIG. 2 is a fragmentary perspective view of a modified belt conveyor wherein the belt consists of a single layer having a single stratum.

FIG. 2 illustrates a simpler belt 1a which consists of a single layer 6 of plastic material. This layer can be identical with the layer or stratum 3 in the belt 1 of FIG. 1. For example, the layer 6 can be made of an elastomeric plastic material. The windows 5 receive inserts or indicia (one shown at 7) which fill or nearly fill the respective windows and which, save for a single characteristic, can be made of the same material as the layer 6. Again, each window 5 extends all the way between the two sides of the layer 6 and the material of the layer 6 exhibits at least one optically discernible characteristic which is different from that of the material of the inserts 7. This brings about the aforediscussed advantages, i.e., the inserts are readily discernible by an eye and their outlines are sharp.

The method of affixing the inserts 7 to the layer 6 can include the utilization of a suitable adhesive. It is presently preferred to resort to a welding technique, such as thermal or ultrasonic welding. It has been found that, quite surprisingly, the belt 1 or 1a can stand long periods of wear and/or other stresses in spite of the fact that the windows 5 extend all the way through the composite layer including the strata, 3, 4 of the belt 1 or through the entire single layer 6 of the belt 1a. This renders it possible to make a continuous (uninterrupted) reinforcing stratum 4 and/or the substrate 2 optional, i.e., the layer 3 or 6 alone suffices to ensure that the belt 1 or 1a will be capable of withstanding long periods of use because bonding of the inserts 5A or 7 to the respective layer 3 or 6 ensures the making of a belt (1a) or a composite layer (3+4) which is not weaker than a belt or layer which is devoid of windows.

Figure 3:
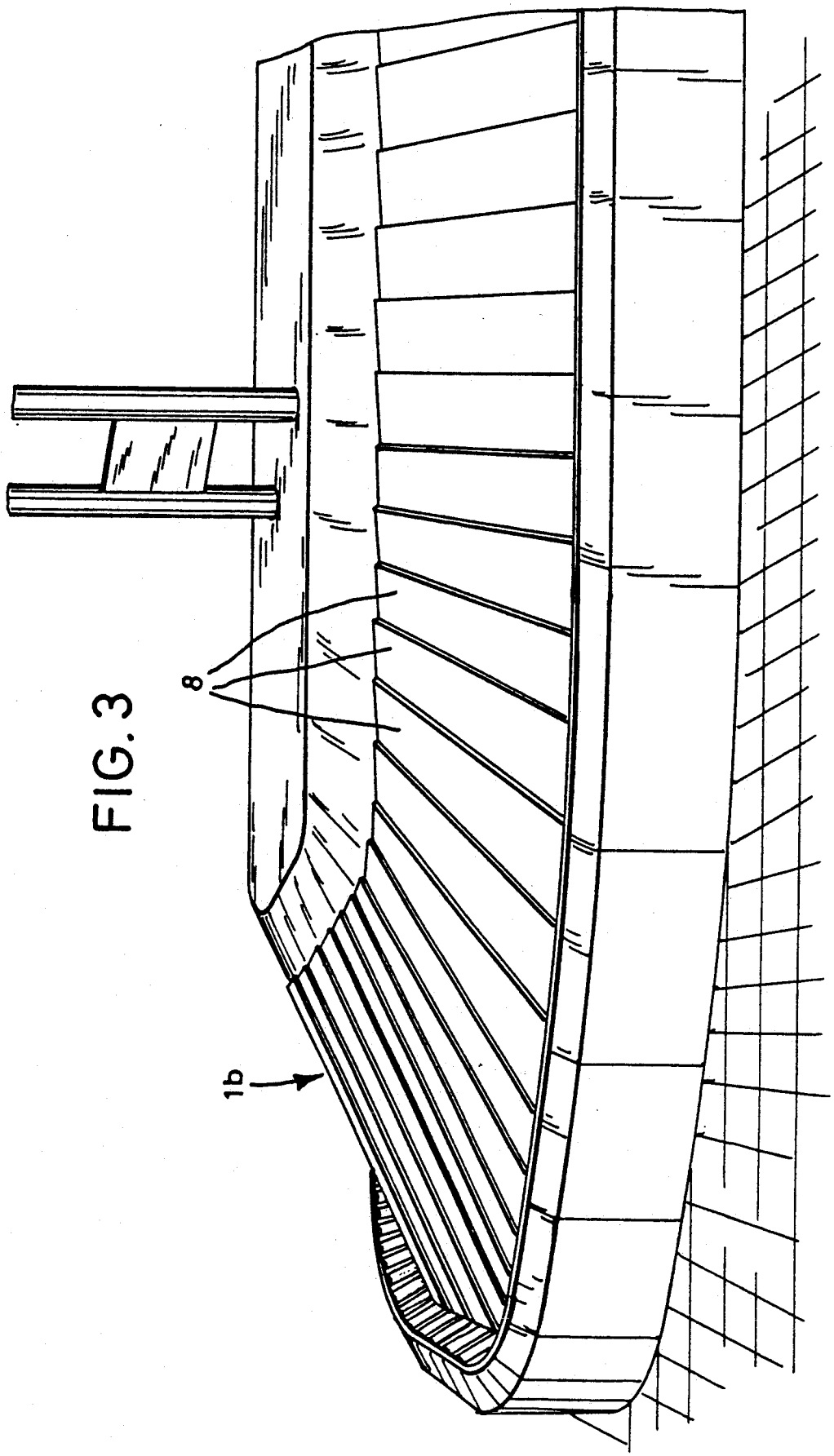
FIG. 3 is a fragmentary perspective view of a carrousel having a scalloped belt conveyor.

FIG. 3 shows a portion of a carrousel type conveyor of the type often found in airport terminals to deliver luggage to arriving passengers or porters. The conveyor comprises an endless scalloped belt 1b including a plurality of partially overlapping layers 8 each of which can constitute a layer of the type sown in FIG. 2 or a composite layer (including the strata 3 and 4) of the type shown in FIG. 1. Alternatively, each of the layers 8 can constitute a rigid or practically rigid plate-like body. If the layers 8 are constructed in a manner as shown in FIG. 1, their substrates can consist of a metallic sheet material and their composite layers or sections can comprises strata of elastomeric plastic material. Alternatively, each layer 8 can comprise a stratum of metallic sheet material and a stratum of suitable plastic material which is bonded to one side of the stratum of metallic sheet material. Each such layer can be provided with a single window or with a number of separate windows. The arrangement may be such that the inserts in the windows of several neighboring layers 8 jointly convey a message, or that the indicium or indicia in a single layer 8 can convey a full message. If the layers 8 comprise several strata and only one of these strata is provided with one or more windows, the stratum having windows can be applied to a metallic substrate and the insert or inserts are thereupon introduced into their windows and bonded or glued to windowed stratum and, if necessary, also to the metallic substrate.

Each layer 8 can be made of a single stratum or layer of a suitable wear-resistant plastic material, e.g., a layer of the type shown in FIG. 2. The single stratum or layer is preferably made of a material which can resist tensional, flexing and numerous other stresses including resistance to puncturing or tearing such as is necessary to stand the impacts by large and heavy pieces of luggage, crates and the like.

Windows 5 and inserts 5A or 7 were omitted in FIG. 3 for the sake of simplicity and clarity. As already mentioned above, each layer 8 can be provided with a single window or with two or more windows, depending on the nature of inserts or indicia which are to be introduced into such window or windows. The color or another characteristic of each insert is preferably different from the material of the layers 8 to ensure ready discernibility of the inserts including their outlines.

An important advantage of the improved conveyor is that the useful life of the belt is not affected by the provision of one or more windows in at least one of its layers or in the single layer. The ability of the belt to stand wear, flexing, rubbing, tensional and/or other stresses is restored by the insert or inserts which extend into the respective window or windows 5 and are properly affixed to the layer or layers in the aforedescribed manner.

The advantages of the improved belt have been ascertained in actual use. It has been found that the belt 1 or 1a can readily stand stresses which develop if the belt is trained over two or more relatively small pulleys at the checkout counters or for similar purposes. The insert or inserts are readily discernible during the entire useful life of the belt which is of considerable importance to advertisers. Moreover, the outlines of the inserts remain sharp during each stage of the useful life of the respective belt or belts. By cutting all the way through one or more layers of the improved belt, one can ensure the formation of windows having highly complex outlines to accept eye-pleasing inserts representing written or typed messages, graphic representations and/or many others. The inserts can represent filigree or other intricate ornamental work which can be used to convey a message or to simply enhance the appearance of the belt.

Multilayer belts which contain two or more layers or strata are often used in conveyors at the checkout counters in order to stand long periods of use and abuse. Reinforcing layers or strata of textile material (as shown at 4 in FIG. 1) are customary. The wear upon the exposed layer or stratum (such as the stratum 3 of the belt 1 of FIG. 1) determines the useful life of the belt.

Heretofore known procedures of applying information to belts of conveyors or the like involved the engraving and subsequent filling of the thus obtained recesses with a filler material. The outlines of such indicia which are not introduced into windows extending all the way between the two sides of a layer are not as sharp as those of the indicia or inserts 5A and 7 which are shown in FIGS. 1 and 2.

If a cutting implement which operates with one or more jets of a pressurized liquid is used to form the windows 5 and/or the inserts 5A or 7, the implement is preferably oriented in such a way that the jet or jets propagate themselves at right angles to one side of the layer or stratum which is to be provided with one or more windows or which serves as a blank for the making of one or more inserts. It has been found that such method renders it possible to form windows and inserts having a sharply and accurately defined outline.

Although it is equally within the purview of the invention to make the insert or inserts of a material other than that of the layer or stratum which is provided with one or more windows, it is presently preferred to make the insert or inserts of the same material as that of the windowed layer or stratum or strata. This ensures that many important characteristics of the windowed layer or stratum or strata match those of the insert or inserts. Such characteristics include the elasticity, the resistance to wear, thermally induced expansion or contraction and/or others. Difference in a single characteristic, normally color, suffices to ensure accurate discernibility of the insert or inserts when the making of the improved belt is completed. At the same time, the life span of the windowed layer or stratum or strata can be the same as that of the insert or inserts, and the presence of one or more inserts does not affect the ability of the belt to be trained over and driven by suitable pulleys regardless of the diameters of the pulleys. In other words, the ability of the belt to be trained over small pulleys is not affected by the provision of one or more inserts.

It is further possible to coat at least one side of the improved belt (e.g., the upper side of the stratum 3), inclusive of the respective side or sides of properly installed insert or inserts, with one or more films or coats of a light transmitting (transparent or translucent) material. Such material (indicated in FIG. 2 by the legend "FILM") can be applied to shield the adjacent layer or stratum and the insert from excessive wear. The nature and light transmissivity of the film or films of material at the exposed side of the belt will be selected with a view not to affect the discernibility of the insert or inserts and of their outlines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A conveyor comprising:
   a belt including at least one layer with a first side, a second side and at least one window extending all the way from said first side to said second side; and
   an insert received in said at least one window, said window defining an open area that has an outline complementary to that of said insert, said insert being affixed to said belt, said insert having at least one characteristic which facilitates optical discernment of the insert by an eye trained upon one of said sides, said insert filling in substantially all of said area; wherein said outline of said at least one window is indicative of an outline corresponding to that of indicia.

2. A conveyor comprising:
   a belt including at least one layer with a first side, a second side and at least one window extending all the way from said first side to said second side; and
   an insert received in said at lest one window, said window having an outline complementary to that of said insert, said insert being affixed to said belt, said insert having at least one characteristic which facilitates optical discernment of the insert by an eye trained upon one of said sides, said at least one layer having a plurality of strata.

3. The conveyor of claim 2, wherein said insert is bonded to said belt.

4. A conveyor comprising:
   a belt including at least one layer with a first side, a second side and at least one window extending all the way from said first side to said second side; and
   an insert received in said at least one window, said window having an outline complementary to that of said insert, said insert being affixed to said belt, said insert having at least one characteristic which facilitates optical discernment of the insert by an eye trained upon one of said sides, said at least one layer having a first resistance to wear, said insert having a second resistance to wear at least approximating said first resistance.

5. A conveyor comprising:
   a belt including at least one layer with a first side, a second side and at least one window extending all the way from said first side to said second side; and
   an insert received in said at least one window, said window having an outline complementary to that of said insert, said insert being affixed to said belt, said insert having at least one characteristic which facilitates optical discernment of the insert by an eye trained upon one of said sides, said at least one layer having a first thickness, said insert having a second thickness at least approximating said first thickness.

6. A conveyor comprising:
   a belt including at least one layer with a first side, a second side and at least one window extending all the way from said first side to said second side; and
   an insert received in said at least one window, said window having an outline complementary to that of said insert, said insert being affixed to said belt, said insert having at least one characteristic which facilitates optical discernment of the insert by an eye trained upon one of said sides, said characteristic being the color of said insert, said one side of said at least one layer having a second color different from the color of said insert.

7. A conveyor comprising:
   a belt including at least one layer with a first side, a second side and at least one window extending all the way from said first side to said second side; and
   an insert received in said at least one window, said window having an outline complementary to that of said insert, said insert being affixed to said belt, said insert having at least one characteristic which facilitates optical discernment of the insert by an eye trained upon one of said sides, said belt being an endless belt, said at least one layer containing an elastomeric material.

8. A conveyor comprising:
a belt including at least one layer with a first side, a second side and at least one window extending all the way from said first side to said second side; and
an insert received in said at least one window, said window having an outline complementary to that of said insert, said insert being affixed to said belt, said insert having at least one characteristic which facilitates optical discernment of the insert by an eye trained upon one of said sides, said belt being an endless belt and comprising a plurality of partially overlapping layers which are movable relative to each other.

9. A conveyor comprising:
a belt including at least one layer with a first side, a second side and at least one window extending all the way from said first side to said second side; and
an insert received in said at least one window, said window having an outline complementary to that of said insert, said insert being affixed to said belt, said insert having at least one characteristic which facilitates optical discernment of the insert by an eye trained upon one of said sides, said belt further comprising a light-transmitting layer overlying said first side of said at least one layer.

10. A conveyor comprising:
a belt including at least one layer with a first side, a second side and at least one window extending all the way from said first side to said second side; and
an insert received in said at least one window, said window having an outline complementary to that of said insert, said insert being affixed to said belt, said insert having at least one characteristic which facilitates optical discernment of the insert by an eye trained upon one of said sides, said belt further comprising a substrate at said second side of said at least one layer.

11. A conveyor comprising:
a belt including at least one layer with a first side, a second side and at least one window extending all the way from said first side to said second side; and
an insert received in said at least one window, said window having an outline complementary to that of said insert, said insert being affixed to said belt, said insert having at least one characteristic which facilitates optical discernment of the insert by an eye trained upon one of said sides, said belt further comprising a reinforcing layer at said second side of said at least one layer.

12. The conveyor of claim 11, wherein said belt further comprises a substrate adjacent said reinforcing layer, said reinforcing layer being sandwiched between said at least one layer and said substrate.

13. The conveyor of claim 12, wherein said reinforcing layer contains a textile material.

14. A conveyor comprising:
a belt including at least one layer with a first side, a second side and at least one window extending all the way from said first side to said second side; and
an insert received in said at least one window, said window having an outline complementary to that of said insert, said insert being affixed to said belt, said insert having at least one characteristic which facilitates optical discernment of the insert by an eye trained upon one of said sides, said at least one layer consisting of a plastic material.

15. The conveyor of claim 1, wherein said indicia is selected from the group consisting of a symbol, a capital letter, a numeral, a trademark, a complete word, a geometrical figure, a part of a message, a message, a graphic representation, a filigree, intricate ornamental work.

16. The conveyor of claim 1, wherein said insert extends within said at least one window to be at most completely flush with said first side of said layer.

17. A method of making a conveyor, comprising the steps of providing a belt having at least one layer with a first side and a second side with at least one window extending all the way from said first side to said second side and having a predetermined outline; introducing into the at least one window an insert having a second outline complementary to said predetermined outline and having at least one characteristic which facilitates optical discernment of the insert by an eye at least from one side of the at least one layer; and affixing the insert in the belt; wherein said outline of said at least one window is indicative of an outline corresponding to that of indicia.

18. The method of claim 17, wherein said affixing step comprises bonding the insert to the belt.

19. The method of claim 17, wherein said at least one characteristic is color.

20. A conveyor comprising:
a belt including at least one layer with a first side, a second side and at least one window extending all the way from said first side to said second side; and
an insert received in said at least one window, said at least one window having an outline complementary to that of said insert, said insert extending within said at least one window so as to be at most completely flush with said first side of said layer, said insert being affixed to said belt and having at least one characteristic which facilitates optical discernment of the insert by an eye trained upon one of said sides; wherein said outline of said at least one window is indicative of an outline corresponding to that of indicia.

21. A conveyor comprising a belt including at least one layer with a first side, a second side and at least one window extending all the way from said first side to said second side, said at least one window having a sharply and accurately defined outline formed by a jet of liquid, the outline being complementary to a sharply and accurately defined outline of an insert formed by a jet of liquid, the insert being received in said at least one window and affixed to said belt, each outline of said at least one window and said insert being optically discernable by an eye trained upon one of said sides when said insert is received in said at least one window; wherein said outline of said at least one window is indicative of an outline corresponding to that of indicia.

* * * * *